3,382,251
BENZYLIDENIC DERIVATIVES OF SUBSTI-
TUTED γ-LACTONES AND THEIR PROC-
ESS OF PREPARATION
Gaston Amiard, Thorigny-sur-Marne, and René Heymes,
Romainville, France, assignors to Roussel-UCLAF,
S.A., Paris, France
No Drawing. Continuation-in-part of application Ser. No.
295,815, July 17, 1963. This application Sept. 8, 1965,
Ser. No. 485,952
Claims priority, application France, Aug. 7, 1962,
906,330
4 Claims. (Cl. 260—327)

ABSTRACT OF THE DISCLOSURE

This invention relates to new benzylidenic derivatives of substituted γ-lactones, their process of preparation and intermediates. In particular it relates to benzylidenic derivatives of the 1,4-lactone of 2,4-dihydroxy-3-thiolmethyl-2-butenoic acid, which can also be designated as the benzylidenic derivatives of the enol form of β-thiolmethyl-α-keto-γ-butyro-lactone, of the formula selected from the group consisting of

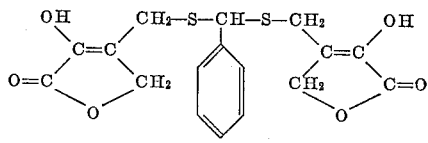

and

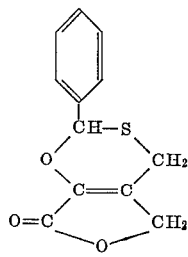

their esters and ethers, intermediates and process of preparation. These benzylidenic derivatives are active in the inhibition and prevention of growth of diverse microorganisms, especially bacteria and fungi.

Cross-references to related applications
and claim of priority

This application is a continuation-in-part of our co-pending United States patent application Ser. No. 295,815, filed July 17, 1963, now abandoned.

The compounds of the invention are benzylidenic derivatives prepared from the 1,4-lactone of 2,4-dihydroxy-3-acetylthiomethyl-2-butenoic acid, which can also be designated as the enol form of β-acetylthiomethyl-α-keto-γ-butyro-lactone, of the general formula

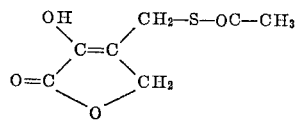

which compound is described in Ser. No. 295,815.

In a recent publication (Biochemical Journal, 1961, 79, 388) Abraham and Newton had described among the degradation products of cephalosporine C, the thioether of the dilactone of the following formula:

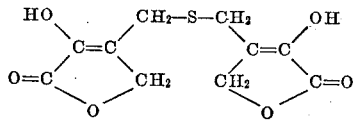

This product permitted the elucidation, along with other proofs, of the structure of cephalosporine C.

An object of the present invention is the obtention of the benzylidenic derivatives of a γ-lactone of the formula selected from the group consisting of

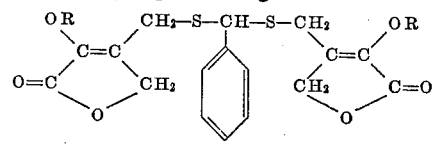

and

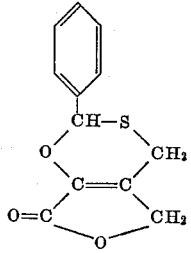

wherein R is selected from the group consisting of hydrogen, lower alkyl, phenyl-lower-alkyl, the acyl radical of an unsubstituted organic carboxylic acid having from one to eighteen carbon atoms and the acyl radical of an unsubstituted organic sulfonic acid having from one to eighteen carbon atoms.

A further object of the present invention is a substituted γ-lactone, the 1,4-lactone of 2,4-dihydroxy-3-acetylthiomethyl-2-butenoic acid, also described as the enol form of β-acetylthiomethyl-α-keto-γ-butyro-lactone, of the general formula

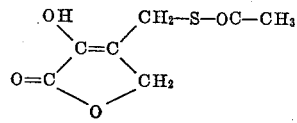

its esters, such as the acetate and tosylate, and its ethers, such as methyl ether and trityl ether.

Another object of the present invention is the development of a process for the preparation of a γ-lactone of the formula

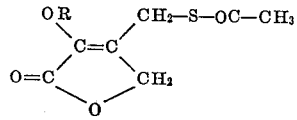

wherein R is selected from the group consisting of hydrogen, lower alkyl, phenyl-lower-alkyl, the acyl radical of an unsubstituted organic carboxylic acid having from one to eighteen carbon atoms and the acyl radical of an unsubstituted organic sulfonic acid having from one to eighteen carbon atoms, which comprise the steps of reacting a Mannich base of the formula

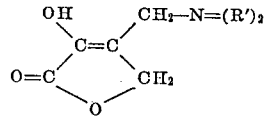

wherein R' is a lower alkyl with thioacetic acid in the presence of an alkali metal thioacetate in an inert solvent at temperatures elevated above room temperature to the refluxing temperature, and recovering said γ-lactone.

A yet further object of the present invention is the development of a process for the preparation of the benzylidenic derivatives of a γ-lactone of the formula selected from the group consisting of

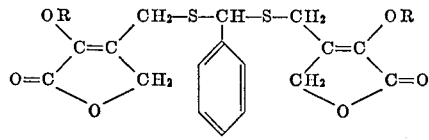

and

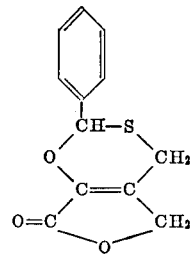

wherein R is selected from the group consisting of hydrogen, lower alkyl, phenyl-lower-alkyl, the acyl radical of an unsubstituted organic carboxylic acid having from one to eighteen carbon atoms and the acyl radical of an unsubstituted organic sulfonic acid having from one to eighteen carbon atoms, which comprises the steps of (1) reacting a Mannich base of the formula

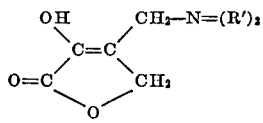

wherein R' is a lower alkyl with thioacetic acid in the presence of an alkali metal thioacetate in an inert solvent at temperatures elevated above room temperature to the refluxing temperature, (2) heating the resulting 1,4 - lactone of 2,4 - dihydroxy - 3 - acetylthiomethyl-2-butenoic acid in a lower alkanol in the presence of an acidic media, at reflux, (3) heating the resulting 1,4-lactone of 2,4 - dihydrozy - 3 - thiolmethyl - 2 - butenoic acid with benzaldehyde in the presence of a water-immiscible organic solvent under conditions of azeotropic distillation, and (4) recovering said benzylidenic derivatives of a γ-lactone.

These and other objects of the invention will become more apparent as the description thereof proceeds.

The benzylidenic derivatives of a γ-lactone of the formula selected from the group consisting of

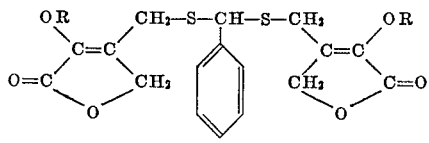

and

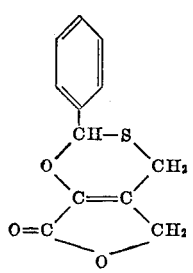

wherein R is selected from the group consisting of hydrogen, lower alkyl, phenyl-lower-alkyl, the acyl radical of an unsubstituted organic carboxylic acid having from one to eighteen carbon atoms and the acyl radical of an unsubstituted organic sulfonic acid having from one to eighteen carbon atoms, of the invention are of interest as active agents in the inhibition or prevention of the growth of microorganisms. In particular, both the benzylidenic derivative of the mono-γ-lactone and the benzylidenic derivative of the bis-γ-lactone are active in the inhibition and prevention of growth of diverse microorganisms, especially bacteria and fungi. They are particularly active against gram positive bacteria of the staphylococcus family (e.g. *Staphylococcus aureus*), against Enterococcus, Micrococcus, *Klebsellia pneumoniae*, *Bacillus subtilis*, *Escherichia coli* and the fungi *Trichophyton mentagrophytes* and therefore may be used in the treatment of conditions wherein such microorganisms are present.

Furthermore, the intermediate, the 1,4-lactone of 2,4-dihydroxy - 3 - acetylthiomethyl - 2 - butenoic acid is easily transformed by an aqueous alkaline treatment in the absence of oxidants into the above-mentioned thioether of the di-lactone. The compound constitutes thus an intermediate in the synthesis of cephalosporine C, a well known antibiotic which can also be obtained, but only with low yields, by fermentation.

The process of the invention for the preparation of the 1,4 - lactone of 2,4 - dihydroxy - 3 - acetylthiomethyl-2-butenoic acid is characterized in that the compound is obtained by treating a Mannich base of the structural formula I

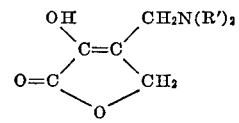

wherein R' is a lower alkyl, preferably in the form of its salt with a mineral acid such as hydrochloric acid, with thioacetic acid in the presence of an alkali metal thioacetate according to the flow diagram below:

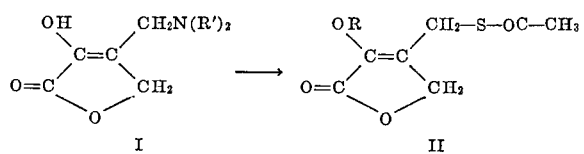

The reaction advantageously occurs in the presence of water and another inert organic solvent such as ether, isopropyl ether or benzene and at temperatures elevated above room temperature. The reaction temperature is necessarily limited by the reflux temperature of the reaction mixture. The desired compound II is purified by extraction with solvents, followed by crystallization. The preparation of the Mannich base I is by the reaction of pyruvic acid with formaldehyde and a di-lower-alkylamine. The preparation of the preferred starting material, the hydrochloride of the 1,4-lactone of 2,4-dihydroxy-3-dimethylaminomethyl-2-butenoic acid (I, R'=CH₃) has been described in the literature (Ber. Deut. Chem. Gesell., 1924, 57, 1108–1115).

At the same time as the 1,4-lactone of 2,4-dihydroxy-3-acetylthiomethyl-2-butenoic acid (II, R=H) is obtained, there is obtained in the course of the reaction the corresponding enol acetate of the formula

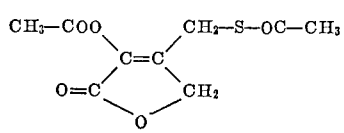

This compound is found in the mother liquor of the crystallization of compound II, R=H, and can be transformed into the 1,4-lactone of 2,4-dihydroxy-3-acetylthiomethyl-2-butenoic acid in the following manner:

The mother liquors of the crystallization of compound II, R=H, are taken up in ether and treated with gaseous ammonia dissolved in methanol or ethanol. The acetate of the enol is saponified and the ammonium enolate, insoluble in ether, precipitates. By treatment with a mineral or organic acid, a supplemental quantity of compound II, R=H, is furnished.

The 1,4-lactone of 2,4-dihydroxy-3-acetylthiomethyl-2-butenoic acid, II, R=H, can be, if desired, further processed to form an ester or an ether in the 2 position of the molecule. Ester can be formed by the reaction of an esterifying derivative, such as the free acid, the acid chloride or the acid anhydride, of an organic carboxylic acid having from one to eighteen carbon atoms or an organic sulfonic acid having from one to eighteen carbon atoms, under esterifying conditions. Ethers can be formed by the reaction of an etherifying derivative, such as the diazo derivative or the halide of a lower alkyl compound or a phenyl-lower-alkyl compound, under etherifying conditions. To form an ester preferably, the acid chloride is reacted with compound II, R=H, in the presence of a tertiary organic base such as pyridine or triethylamine and an inert solvent. To form an ether, preferably a diazo-lower alkane or a phenyl-lower-alkyl halide is reacted with compound II, R=H, in an inert solvent.

Among the organic carboxylic acids having from one to eighteen carbon atoms are alkanoic acids such as acetic acid, lauric acid, stearic acid, etc.; alkenoic acids such as undecenylic acid, oleic acid, etc.; phenylalkanoic acids such as phenylacetic acid, p-methyl-phenylacetic acid, etc.; cycloalkanoic acids such as cyclohexanoic acid, tetrahydrophthalic acid, etc.; cycloalkylalkanoic acids such as cyclohexylacetic acid, etc.; phenylcarboxylic acids such as benzoic acid, phthalic acid, etc. Use of such acids gives compound II where R is the acyl radical of an organic carboxylic acid having from one to eighteen carbon atoms.

Among the organic sulfonic acids having from one to eighteen carbon atoms are alkane sulfonic acids, such as methane sulfonic acid, etc.; phenyl sulfonic acids, such as p-toluene sulfonic acid, etc. Use of such acids gives compound II where R is the acyl radical of an organic sulfonic acid having from one to eighteen carbon atoms.

Among the diazo-lower-alkanes are diazomethane, diazoethane, etc. Use of such diazo-lower-alkanes gives compound II where R is lower alkyl.

Among the phenyl-lower-alkyl halides are trityl chloride, etc. Use of such phenyl-lower-alkyl halides gives compound II where R is phenyl-lower-alkyl.

Finally, the 1,4-lactone of 2,4-dihydroxy-2-acetylthiomethyl-2-butenoic acid (II, R=H) can be hydrolyzed by a mineral acid in an inert anhydrous organic solvent to give the free mercaptan, the 1,4-lactone of 2,4-dihydroxy-3-thiolmethyl-2-butenoic acid. The sulfur in this compound can be protected in the form of an S-tritylated compound by reacting the 1,4-lactone of 2,4-dihydroxy-3-thiolmethyl-2-butenoic acid with trityl chloride in an inert organic solvent while removing the evolved hydrochloric acid. The 1,4-lactone of 2,4-dihydroxy-3-tritylthiomethyl-2-butenoic acid is recovered.

The overall process of the invention for the preparation of the benzylidenic derivatives of a γ-lactone of the formula selected from the group consisting of

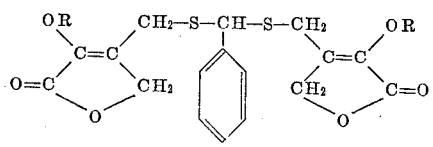

and

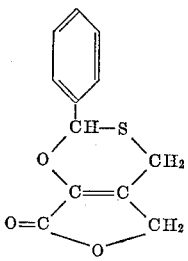

wherein R is selected from the group consisting of hydrogen, lower alkyl, phenyl-lower-alkyl, the acyl radical of an unsubstituted organic carboxylic acid having from one to eighteen carbon atoms and the acyl radical of an unsubstituted organic sulfonic acid having from one to eighteen carbon atoms, is characterized by the following flow diagram:

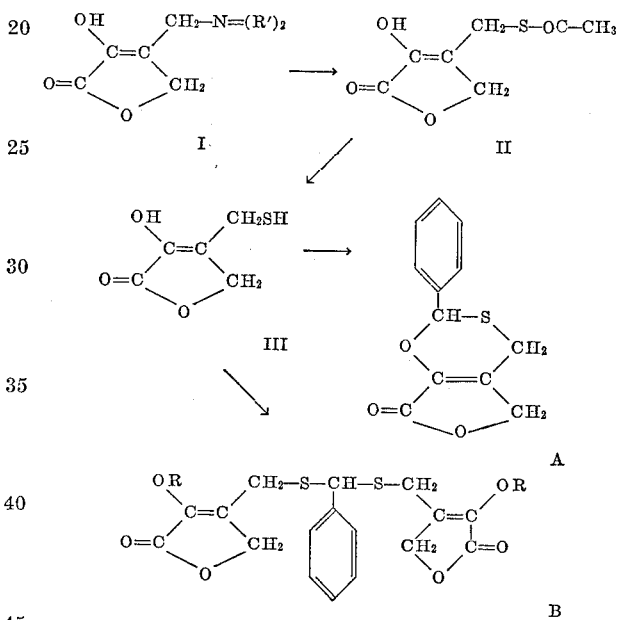

wherein R and R' have the above-assigned values.

The preparation of Compound II is described above. Compound II is advantageously heated in an anhydrous lower alkanolic media, such as dry ethanol, in the presence of an acidic media such as dry hydrochloric acid. Preferentially the reaction mixture is heated until the lower alkanol is distilled off. The residue is constituted by the 1,4-lactone of 2,4-dihydroxy-3-thiolmethyl-2-butenoic acid, III. Compound III is taken up in a water-immiscible organic solvent such as an aromatic hydrocarbon, for example, benzene, an excess of benzylaldehyde is added thereto and the reaction mixture is heated under azeotropic distillation to remove the water therefrom. The solvent is then distilled therefrom and the residue recovered. This residue comprises mainly compound B and is recovered by crystallization.

Compound A is obtained by taking Compound III up in a water-immiscible organic solvent, adding an excess of benzaldehyde thereto and azeotropically distilling about one half of the solvent therefrom together with the water formed. A small amount of a strong organic acid, particularly an organic sulfonic acid such as p-toluene sulfonic acid is added to the concentrated solution and the solvent distilled therefrom is replaced by an equal amount of the water-immiscible organic solvent. The acidified reaction mixture is then heated and about one half of the solvent is again distilled therefrom. The solution is cooled, water added and the organic phase separated and concentrated. On cooling, crystals of Compound B form and are separated. The mother liquor is then concentrated to dryness and Compound A is recrystallized from the residue.

Esters and ethers of Compound B, R=H, can be prepared similarly as the esters and ethers of Compound II, R=H, as described above.

The following examples are given to enable those skilled in the art to better comprehend and practice the invention. It is to be understood, however, that they are not to be deemed limitative.

Example I.—Preparation of the 1,4-lactone of 2,4-dihydroxy-3-acetylthiomethyl-2-butenoic acid (II, R=H)

Under a stream of nitrogen and under mechanical agitation, the following ingredients were mixed in the order given:

| | |
|---|---|
| Thioacetic acid _____ cc__ | 292 |
| Distilled water _____ cc__ | 1000 |
| Sodium bicarbonate _____ gm__ | 175 |
| Hydroquinone _____ gm__ | 1 |
| Ether _____ cc__ | 1400 |
| Mannich base, the 1,4-lactone of 2,4-dihydroxy-3-dimethylamino - methyl - 2 - butenoic acid (I, R'=CH$_3$) in the state of the hydrochloride _gm__ | 200 |

The reaction mixture was heated for a period of four hours at a slight reflux without interrupting either the agitation or the current of nitrogen. When the reaction had terminated, the reaction mixture was cooled to 0 to +5° C. The aqueous phase was decanted and extracted with ether. The ethereal extracts were combined with the organic phase, dried over magnesium sulfate, filtered and evaporated to dryness under vacuum. The oily residue was heated under the vacuum of a water jet pump towards 80° C. in order to remove the maximum of thioacetic acid which it contained. When the distillation of this compound ceased the material was allowed to cool. The residue was taken up by a luke-warm mixture of 60 cc. of cyclohexane and 140 cc. of benzene and iced while scratching in order to bring about crystallization. The solution was allowed to crystallize for about a half hour. The crystals were vacuum filtered and washed with a mixture of equal parts of benzene and cyclohexane. After drying, a first yield of 62 gm. of the 1,4-lactone of 2,4-dihydroxy-3-acetylthiomethyl-2-butenoic acid (II, R=H) was obtained having a melting point of 78° C.

The mother liquors were evaporated to dryness and the oily residue obtained, which consisted of the 1,4-lactone of 2-acetoxy-4-hydroxy-3-acetylthiomethyl - 2 - butenoic acid (II, R=COCH$_3$) was taken up in two liters of ether. 312 cc. of a 5 N solution of gaseous ammonia dissolved in methanol was added. The amomnium enolate of β-acetylthiomethyl-α-keto-γ-butyrolactone, which was insoluble in ether, precipitated. The crystals were vacuum filtered, washed with ether, then taken up in water and acidified by hydrochloric acid to a pH of 1 in the presence of ether. The ether extracted the free enol. The aqueous phase was re-extracted, the ethereal extracts were combined, dried over magnesium sulfate, evaporated to dryness and recrystallized as above in the mixture of cyclohexanebenzene. After vacuum filtering, washing and drying, 27 gm. of pure 1,4-lactone of 2,4-dihydroxy-3-acetylthiomethyl-2-butenoic acid (II, R=H) were obtained having a melting point of 78° C.

The enol form of β-acetylthiomethyl-α-keto-γ-butyrolactone was soluble in water, dilute aqueous acids, alcohols, ether, acetone, benzene and chloroform.

The ultraviolet spectra determined in N/10 hydrochloric acid solution showed a λ maximum at 238 mμ

$$(E_{1\,cm.}^{1\%}=730)$$

*Analysis.*—C$_7$H$_8$O$_4$S; molecular weight=188.2. Calculated: C, 44.67%; H, 4.29%; O, 34.0%; S, 17.04%. Found: C, 44.5%; H, 4.2%; O, 34.0%; S, 16.9%.

This compound is not described in the literature.

This compound easily furnishes the corresponding esters by treatment with acid chlorides.

Example II.—Preparation of the 1,4-lactone of 2-acetoxy-4-hydroxy - 3-acetylthiomethyl - 2-butenoic acid (II, R=COCH$_3$)

1.9 gm. of the enol form of β-acetylthiomethyl-α-keto-γ-butyrolactone (II, R=H) were dissolved in 10 cc. of anhydrous benzene and 0.9 cc. of pyridine was added thereto. The reaction mixture was cooled on an iced bath and drop by drop 0.9 cc. of acetyl chloride was added. The mixture was agitated for several minutes more. The benzenic solution was washed with water, dried over magnesium sulfate and evaporated to dryness. The product crystallized. The remainder of the benzene was eliminated by taking the residue up in petroleum ether, a part of the petroleum ether was distilled therefrom and the product was allowed to crystallize. The crystals were vacuum filtered, washed with a mixture of ether and petroleum ether (1:1). 1.9 gm. of the enol acetate of β-acetylthiomethyl-α-keto-γ-butyrolactone, which is also the 1,4-lactone of 2-acetoxy - 4-hydroxy - 3-acetylthiomethyl-2-butenoic acid (II, R=COCH$_3$), were obtained having a melting point of 74–76° C. This product could be transformed by treatment with ammonia and subsequent acidification into the free enol form of Compound II, R=H, as outlined above, The enol acetate was poorly soluble in water and dilute aqueous acids and soluble in alcohol, ether, acetone, benzene and chloroform.

Spectra U.V. λ max.=218 mμ in water $$(E_{1\,cm.}^{1\%}=652)$$

*Analysis.*—C$_9$H$_{10}$O$_5$S; molecular weight=230.23. Calculated: C, 46.96%; H, 4.38%; O, 34.73%; S, 13.93%. Found: C, 47.1%; H, 4.4%; O, 34.7%; S, 13.6%.

This compound is not described in the literature.

Example III.—Preparation of the 1,4-lactone of 2-(p-toluenesulfonyloxy) - 4-hydroxy - 3-acetyl-thiomethyl-2-butenoic acid (II, R=SO$_2$C$_6$H$_4$CH$_3$)

The enol form of β-acetylthiomethyl-α-keto-γ-butyrolactone, II, R=H, could also be transformed into the tosylate. 9.4 gm. of the 1,4-lactone of 2,4-dihydroxy-3-acetylthiomethyl - 2-butenoic acid (II, R=H) were dissolved in 50 cc. of chloroform. 8.5 cc. of triethylamine were added thereto. The reaction mixture was agitated on an iced bath while adding rapidly 11 gm. of tosyl chloride. The mixture was agitated several minutes at room temperature. The chloroformic layer was separated, washed with water, dried over magnesium sulfate, filtered, and concentrated until crystallization started. Methanol was added thereto and the solution was concentrated and iced. The crystals were vacuum filtered and washed with methanol. After drying, 13.6 gm. of the enol tosylate of β-acetylthiomethyl-α-keto-γ-butyrolactone, which is also the 1,4-lactone of 2-(p-toluene-sulfonyloxy) - 4-hydroxy-3-acetylthiomethyl-2-butenoic acid (II, R=SO$_2$C$_6$H$_4$CH$_3$), were obtained having a melting point of 120° C. The product was insoluble in water, dilute acids and alkalis, partly soluble in alcohol, and ether and soluble in chloroform.

*Analysis.*—C$_{14}$H$_{14}$O$_6$S$_2$; molecular weight=342.37. Calculated: C, 49.11%; H, 4.12%; S, 18.73%. Found; C, 49.2%; H, 4.2%; S, 18.7%.

This product is not described in the literature.

Example IV

Compound II, R=H, could also be transformed into the corresponding ethers by classical procedures.

By treatment with diazomethane, the corresponding methyl ether of the enol of β-acetylthiomethyl-α-keto-γ-butyrolactone, which is also the 1,4-lactone of 2-methoxy-4 - hydroxy - 3 - acetylthiomethyl - 2 - butenoic acid (II, R=CH$_3$) was furnished having a melting point of 25° C., and by treatment with trityl chloride, the trityl ether or the 1,4-lactone of 2-trityloxy - 4-hydroxy - 3-acetyl-thiomethyl-2-butenoic acid (II, R=C(C₆H₅)₃) was obtained having a melting point of 170–171° C.

By acid hydrolysis, Compound II, R=H, furnished the free mercaptan according to the flow diagram:

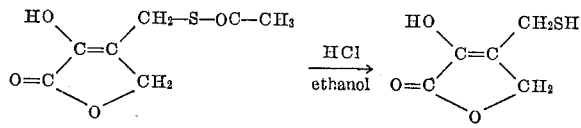

The mercaptan could be selectively tritylated on the sulphur by reacting trityl chloride thereupon in the absence of a base which would neutralize the hydrochloric acid evolved.

Example V.—Preparation of the 1,4-lactone of 2,4-dihydroxy-3-tritylthiomethyl-2-butenoic acid 5. gm. of the enol form of β-acetylthiomethyl-α-keto-γ-butyrolactone, II, R=H, where boiled for one hour and thirty minutes at reflux with 50 cc. of ethanol containing 1% of gaseous hydrochloric acid. The alcohol was removed by distillation under vacuum and the last traces of solvent were eliminated by taking up the residue in benzene and distilling this solution under vacuum. The free mercaptan, the 1,4-lactone of 2,4-dihydroxy-3-thiolmethyl-2-butenoic acid, III, was recovered. The oily residue obtained was dissolved in 40 cc. of chloroform and 8 gm. of trityl chloride were added. The hydrochloric acid formed commenced to evolve at once and at evolution was facilitated by creating a slight vacuum in the apparatus. Then the reaction mixture was heated to 60° C. in order to completely remove the hydrochloric acid and the solvent. The derivative tritylated on the sulphur crystallized. The compound was triturated with ether, vacuum filtrated and washed with ether. After drying the S-tritylated derivative, the 1,4-lactone of 2,4-dihydroxy-3-tritylthiomethyl-2-butenoic acid was obtained in the form of prisms. The product had a melting point of 180° C. and was soluble in chloroform, slightly soluble in alcohol and dilute alkalis and insoluble in water, dilute acids and ether.

Analysis.—C₂₄H₂₀O₃S; molecular weight=388.46. Calculated: C, 74.20%; H, 5.19%; S, 8.25%. Found: C, 74.3%; H, 5.1%; S, 8.2%.

This compound is not described in the literature

Example VI.—Preparation of Benzylidene bis-[α-hydroxy-β-thiomethyl-α,β-butenolide] Compound B, R=H A solution of 5 gm. of 1,4-lactone of 2,4-dihydroxy-3-acetylthiomethyl-2-butenoic acid (II, R=H) in 50 cc. of ethanol containing 1% of gaseous hydrochloric acid was heated at reflux and under atmosphere of nitrogen for 2 hours, then it was concentrated to remove the solvent. A residue was obtained comprising raw 1,4-lactone of 2,4-dihydroxy-3-thiolmethyl-2-butenoic acid, III.

Next, 5 cc. of benzaldehyde and 40 cc. of benzene were added to the residue. The solution obtained was heated with azeotropic distillation for 30 minutes to remove water, then concentrated to dryness under vacuum. The raw crystallized product obtained was taken up in 20 cc. of ether, vacuum filtered and dried. 3 gm. of benzylidene bis-[α-hydroxy-β-thiomethyl-α,β-butenolide]. Compound B, R=H, were isolated, having an instantaneous melting point of 135° C.

Analysis.—C₁₇H₁₆O₆S₂; molecular weight=380.42. Calculated: C, 53.63%; H, 4.24%; S, 16.85%. Found C, 53.8%; H, 4.4%; S, 16.8%.

This compound is not described in the literature.

Example VII.—Preparation of the benzylidenic derivative of the α-hydroxy-β-mercaptomethyl-α,β-butenolide, Compound A A solution of 10 gm. of the 1,4-lactone of the 2,4-dihydroxy-3-acetylthiomethyl-2-butenoic acid in 100 cc. of ethanol containing 1% of gaseous hydrochloric acid, was heated at reflux under atmosphere of nitrogen for 3 hours, then concentrated to remove the solvent. A residue was obtained.

Next, 10 cc. of benzaldehyde and 100 cc. of benzene were added to the residue and the solution obtained was heated, the water formed was entrained by azeotropic distillation therefrom of about 50 cc. of benzene within a period of 30 minutes. After having added 0.5 gm. of p-toluene sulfonic acid and 50 cc. of benzene, again 50 cc. of benzene were distilled therefrom under the same conditions. After cooling, the concentrated, acidified solution was taken up with a small amount of water. The organic phase was decanted, dried and concentrated. The product which crystallized was separated. These crystals were benzylidene bis-[α-hydroxy-β-thiomethyl-α,β-butenolide], Compound B, R=H.

The mother liquor after separation of the crystals was concentrated to dryness under vacuum. 2.8 gm. of a second compound was separated, which crystallized with the addition of either. These crystals were a benzylidenic derivative of α-hydroxy-β-mercaptomethyl-α,β-butenolide, Compound A, having an instantaneous melting point of 145–150° C.

Analysis.—C₁₂H₁₀O₃S; molecular weight=234.20. Calculated: C, 61.54%; H, 4.30%; S, 13.7%. Found: C, 61.5%; H, 4.3%; S, 13.1%.

This compound is not described in the literature.

The preceding specific embodiments are illustrative of the invention. It is to be understood, however, that alternative process and reactants may be employed without departing from the spirit of the invention or the scope of the appended claims.

We claim:

1. The benzylidenic derivatives of a γ-lactone of the formula selected from the group consisting of

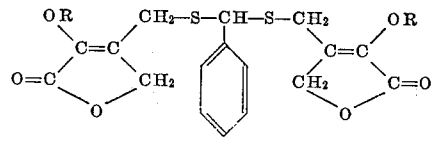

and

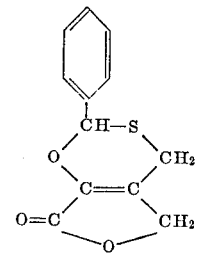

wherein R is selected from the group consisting of hydrogen, lower alkyl, phenyl-lower-alkyl, the acyl radical of an unsubstituted organic carboxylic acid having from one to eighteen carbon atoms, the acyl radical of a carboxyl substituted organic carboxylic acid having from one to eighteen carbon atoms and the acyl radical of an unsubstituted organic sulfonic acid having from one to eighteen carbon atoms.

2. The benzylidenic derivative of α-hydroxy-β-mercaptomethyl-α,β-butenolide of the formula

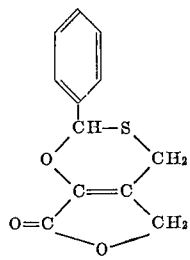

3. The benzylidene bis - [α-hydroxy-β-thiomethyl-α,β-butenolide] of the formula

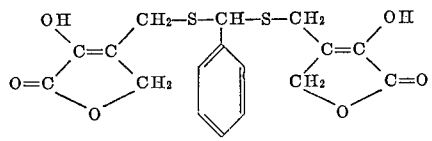

4. A process for the preparation of the benzylidenic derivatives of a γ-lactone of the formula selected from the group consisting of

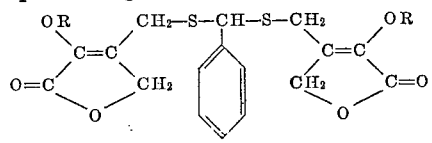

and

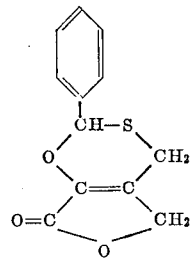

wherein R is selected from the group consisting of hydrogen, lower alkyl, phenyl-lower-alkyl, the acyl radical of an unsubstituted organic carboxylic acid having from one to eighteen carbon atoms, the acyl radical of a carboxyl substituted organic carboxylic acid having from one to eighteen carbon atoms and the acyl radical of an unsubstituted organic sulfonic acid having from one to eighteen carbon atoms which comprises the steps of (1) reacting a Mannich base of the formula

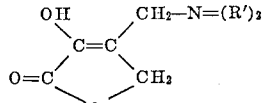

wherein R' is a lower alkyl with thioacetic acid in the presence of an alkali metal thioacetate in an inert solvent at temperatures elevated above room temperature to the refluxing temperature, (2) heating the resulting 1,4-lactone of 2,4-dihydroxy-3-acetylthiomethyl-2-butenoic acid in a lower alkanol in the presence of an acidic media at reflux, (3) heating the resulting 1,4-lactone of 2,4-dihydroxy-3-thiolmethyl-2-butenoic acid with benzaldehyde in the presence of a water-immiscible organic solvent under conditions of azeotropic distillation, and (4) recovering said benzylidenic derivatives of a γ-lactone.

References Cited

UNITED STATES PATENTS 3,145,218   8/1964   Fried et al. _____ 260—343.6

FOREIGN PATENTS 1,365,959   6/1964   France.

OTHER REFERENCES

Senning et al., Arkiv for Kemi, vol. 17, No. 22 (1961), pp. 261–2.

Galantay et al., Tetrahedron Letters, No. 7 (1963), pp. 415–9.

J. A. PATTEN, *Primary Examiner.*